United States Patent [19]

Muller et al.

[11] 3,866,178

[45] Feb. 11, 1975

[54] FREQUENCY DIVISION MULTIPLEX SWITCHING SYSTEM

[75] Inventors: Jean Jacques Muller, Garches; Andre Jean Henquet, Boulogne, both of France

[73] Assignee: International Standard Electric Corporation, New York, N.Y.

[22] Filed: May 1, 1974

[21] Appl. No.: 465,767

[30] Foreign Application Priority Data

May 22, 1973 France ............................ 73.18456

[52] U.S. Cl. ....... 340/171 R, 340/166 R, 179/15 FD

[51] Int. Cl. ............................................ H04j 1/18

[58] Field of Search .................... 340/166 R, 171 R; 179/15 FD

[56] References Cited

UNITED STATES PATENTS 3,480,733 11/1969 Morita ........................... 179/15 FD

*Primary Examiner*—Harold I. Pitts

*Attorney, Agent, or Firm*—James B. Raden; Marvin M. Chaban

[57] ABSTRACT

Disclosed is a system for controlling a frequency division multiplex system by means of indicating signals directed to a central processor. Basically, four conditions occur and these are signalled to the central processor in binary form at two access points. Switching information is exchanged between the two access ponts by way of two signalling frequencies transmitted between terminals associated with a calling and a called subscriber. Both rotary dial and pushbutton dialing outputs are sent as combinations of pulses at these two frequencies.

7 Claims, 3 Drawing Figures

FREQUENCY DIVISION MULTIPLEX SWITCHING SYSTEM

BACKGROUND OF THE INVENTION

The present invention relates to switching system utilized in the field of telecommunication and, more particularly, to a frequency multiplex switching system which uses RF or similar frequencies for controlling the switching of communication channels.

It is known that connections between remote points are usually established through telecommunication exchanges wherein all the means enabling such connections to be established are grouped. Thus, each point is connected to a telecommunication exchange and reaches terminal equipment, which is associated with it in the exchange. Then, the purpose of the exchange is to establish connections between the terminal equipment to place the points in communication with one another.

Switching functions in telecommunication exchanges are identical although the means for achieving the switching may be quite different. Generally stated, presently operating switching systems may be considered as belonging to two basic types: Space-division switching systems and time-division switching system.

Space-division switching systems usually use electromagnetical or electronic switches for establishing an actual communication channel between the terminal equipment to be connected.

Since those communication channels are very expensive, attempts have been made to simultaneously transmit information concerning several communications on a single communication channel in time division form. Time-division switching system results from the principle that any signal may be reconstituted from samples when the sampling frequency is suitably selected. Thus interleaved samples relative to several communications may be transmsitted on a single channel with a short recurring time interval being allotted to each communication.

In addition to switches similar to space-division system switches, time-division switching systems may move samples received during one time interval for transmission during another time interval. Moreover the switching means employed in time division systems must operate at very high speed, and thus are both complex and expensive. Adding to the cost is the necessity for retaining addresses of the points in communication and the channel being used.

SUMMARY OF THE INVENTION

RF techniques may permit the establishment of connections between remote points without the necessity of actual physical connections.

The principle which is utilized in such RF systems is known. One approach is to tune the frequency of a called receiver to the frequency of a calling transmitter, or vice versa. Thus numerous two-way communications may be established by using two different frequencies for each communication.

However, due to frequency spectrum congestion reasons, it is well known that RF exchanges are generally reserved for certain applications, such as mobile radio and the like, wherein they provide known advantages.

In French Pat. No. 73 12 264 filed on Apr. 5, 1973, by one of the Applicants herein for a "Frequency Division Switching Network," there is disclosed a system in which the terminal equipment of an exchange provide RF communication means located in a common room, the room being electromagnetically isolated from outside space. A U.S. counterpart to that application has been filed in the U.S. Patent Office on Mar. 29, 1974.

However, in a telecommunication exchange using frequency-division switching system, there must also be provided supervision and control means associated with the terminal equipment particularly for establishing, holding and releasing RF communication channels. Such supervision and control means may be particularly adapted to the use of frequency-division switching system within the field of telephony.

Accordingly, a frequency multiplex switching system is disclosed by the present invention, mainly comprised of terminal equipment associated with both a transmitter device and receiver device for providing RF communication channels between terminal equipments by frequency tuning. The system shown is particularly characterized by the association of particular frequency signaling means associated with the respective terminal equipment. At least some of the frequency signaling means comprise means for selectively transmitting one or several signaling voice frequencies through the said transmitter device and at least some of them comprise means for detecting at least one of the said signaling voice frequencies received through the said receiver device. In this way, supervision and control signals may be radio-transmitted between the terminal equipment for achieving control of the switching operations concerning the establishment of communications between terminal equipment.

The frequency-division switching system shown by this invention also comprises a control unit which may preferably be a stored program digital computer provided with scanning means capable of gathering information from terminal equipment. The control unit further provides distributing means for transmitting control signals to at least some of the terminal equipment and to a marker for frequency tuning the receiver and/or transmitter devices in terminal equipment. It is clear that frequency signalling exchanges between terminal equipment may also be used to direct the central control unit into its corresponding tasks.

It is another feature of this invention to provide special terminal equipment particularly designed for transmitting signalling information to select which subscriber line terminal equipment should be employed. Thus, when the central control unit is to direct a switching operation in the terminal equipment of a subsriber line, it seizes a suitable special terminal equipment and associates it with the line terminal equipment by frequency tuning the marking means. As a result, signaling frequencies transmitted from the special terminal equipment are detected in the line terminal equipment causing the switching operation to be performed in the line terminal equipment. In this way, the command control unit does not have to directly intervene in the switching operation, once initiated.

For establishing a communication, most of signaling information is directly exchanged between the involved terminal equipment. The signaling information operates a sequential circuit in the terminal equipment for providing a marker function for the various steps of a communication involving the equipment. In certain terminal equipment, the circuit elements (which directly depend on the sequential circuit) operate to control the transmission or permit the reception of signaling frequencies and speech frequencies. These elements may also supervise the transmission of signals necessary to the establishment and maintenance of a communication.

In terminal equipment which must indicate their condition to the command control unit, a first group of those elements controlled by the sequential circuit provides continuous indication of the condition of the corresponding equipment to the said scanning means which check that condition from time to time in order to forward it to the central control unit.

The transmission of signaling frequency or frequencies, and of speech signals to be transmitted toward another terminal equipment is performed through the terminal equipment transmitter device according to the sequential circuit condition by means of a second group of elements controlled by the sequential circuit.

In the terminal equipment involved in the establishment of a speech path, a third group of elements controlled by the sequential circuit is provided. This third group is associated both with terminal equipment receiver device demodulator and with signaling detectors, and also with the speech circuit. The third group enables audio signaling tones and speech signals to be transmitted on the terminal equipment speech path at suitable times defined by the sequential circuit conditions.

Other features of the present invention will appear more clearly from the following description of an embodiment viewed in conjunction with the drawings, described next.

Figure 1:
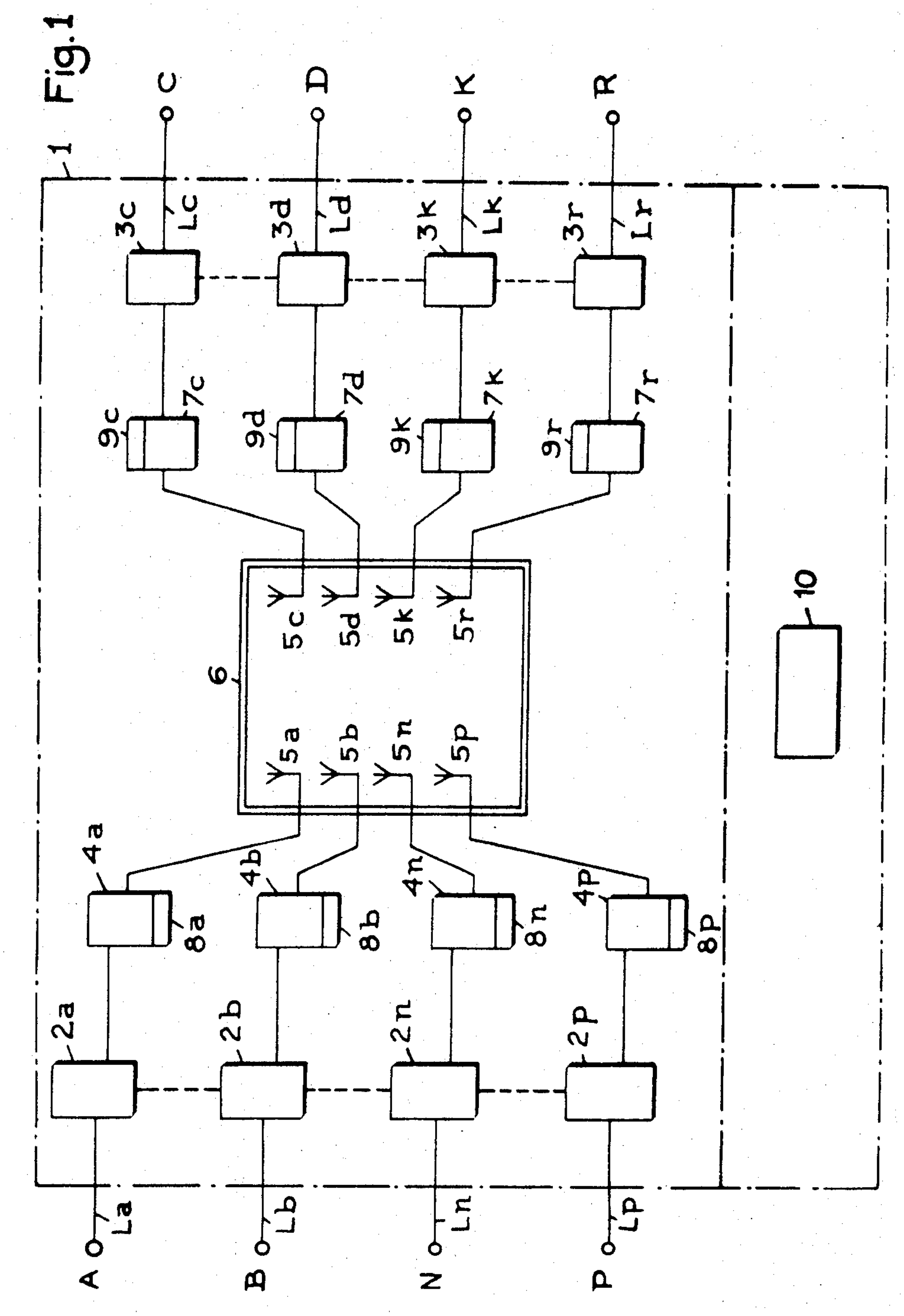
FIG. 1 is a block diagram of a telecommunication exchange which utilizes a frequency multiplex switching system.

DETAILED DESCRIPTION OF THE DRAWINGS:

Referring first to FIG. 1, we show schematically the arrangement of a telephone exchange utilizing a frequencydivision switching system. A system of this type is known from the previously cited Muller patent application. The referenced system may be generally designated as a system in which the connection means for establishing a communication are constituted by RF transmitter and receiver elements, each one being respectively coupled to its antenna within a common switching room. That switching room which is electromagnetically isolated from outside space permits the simultaneou RF exchange between all the antennas of the different transmitter and receiver elements, those elements involved in a specific connection being alone in relation by frequency tuning, such a tuning resulting from frequency allotments from exchange control means.

In a more detailed manner, FIG. 1 indicates a telephone exchange 1 which permits the connection of any point 1, B, N, or P to any point C, D, K or R. Each of these points is connected to a terminal circuit 2, 2*b*, 2*n*, 2*p* and 3*c*, 3*d*, 3*k*, 3*r* via a corresponding line circuit L*a*, L*b*, L*n*, L*p* and L*c*, L*d*, L*k*, L*r*. Each circuit 2*a* – 2*p* is associated with RF transmitter element 4*a* – 4*p* while each circuit 3*c* – 3*r* is associated with an RF receiver element 7*c* – 7*r*. Each of those RF elements is connected to an antenna 5*a* – 5*p* and 5*c* – 5*r* which is associated therewith and located inside switching room 6. The actual switching is designed so as to produce optimum space propagation conditions for RF waves within an isolated space of limited volume. In this way, any RF wave transmitted in room 6 may reach any point and, in particular, any antenna 5 in the common switching room 6.

The main feature of the system is to enable connection of RF channels from each point A, B, N or P to any point C, D, K or R. Thus, the capability of frequency tuning with each receiver element 7 must be provided in each transmitter element 4. Each transmitter element 4*a* – 4*p* or each receiver element 7*c* – 7*r* or both elements may have allotted thereto a frequency tuning device 8*a* – 8*p* or 9*c* – 9*r* which makes tuning possible on every frequency applicable to such a frequency-division switching system.

Frequency synthetizers as used in RF communications make it possible to use a very large number of frequencies. Thus, when N selection frequencies are provided, N one-way communications may be established in the telephone exchange 1. As long as (1) receiver element 7 is tuned to the frequency of the transmitter 4 involved in the same connection; or (2) the reverse condition; or (3) that both transmitter-receiver 4–7 in a same connection are tuned to the same frequency, a connection path is completed. The tuning function is performed in tuning devices 8*a* – 8*p* and 9*c* – 9*r* which are controlled by computer 10 and receive control information from computer 10 through the appropriate peripheral equipment (not shown) which informs them of the frequency to which they have to be tuned.

The manner of establishing a one-way communication between a point A and a point D, for example, may be completed in this fashion. The communication may be a two-way communication if peripherals L*a* and L*c* respectively are transmission and reception channels for a same information source, and peripherals L*b* and L*d* respectively are transmission and reception channels for another information source. The latter two sources may be involved in a two-way connection which requires tuning, such as receiver 7*d* with transmitter 4a and receiver 7*c* with transmitter 4*b* — or vice versa — so that for N different frequencies, only n/2 two-way communications may be established.

Having thus briefly described the operating principle for a frequency-division switching telecommunication exchange, the description will be continued with reference to the figures related more directly to the present invention. The present invention is directed to the manner of using the frequency-division switching principle in a switching network and does not involve the arrangement of the common circuits to effect the common central control of such a network. Such arrangements are well-known and one approach has been illustrated in FIG. 2 which shows the basic diagram of a frequency-division switching exchange using a stored program, central or common control. It is known to arrange telephone exchange equipment in operational groups, such as the network RCT comprising terminal circuits and frequencydivision switching system, network access devices DAR and central control unit UCC. The arrangement of FIG. 2, however, provides a general understanding of how information transfer is effected within an exchange, before describing in detail the circuits which enable frequency-division switching to be performed in the network RCT.

Terminal circuits comprise a first category of devices providing connections from input 11 to output 12 of frequency-division switching system ST, and cables 13–16 connecting the exchange to subscriber sets and remote exchanges. In the first category are subscriber line circuits LA, incoming trunk circuits JA and outgoing trunk circuits JA. Terminal circuits comprise another category of auxiliary devices which are connected only to the frequency-division switching system and are temporarily utilized during a communication, the auxiliary devices providing a number of specific services. Only representative ones of those auxiliary devices have been indicated in FIG. 2, those being subscriber dialing junctors JN, outgoing senders EVD, incoming receivers RA and service line circuits LS.

Each of those terminal circuits — except service line circuits LS — is associated with RF transmitter E and with a RF receiver R having access to transmission system ST. This arrangement is similar to that shown in FIG. 1 wherein the transmission system is completed within switching room 6. Service line circuits LS have no receiver because they have no information to receive, but only act to transmit signalling information corresponding to specific conditions of a communication such as idle condition, busy condition, congestion condition, false call condition or speech data messages, the information being sent to receivers in other terminal circuits.

Terminal circuits of network RCT are controlled by network access devices DAR which serve as interfaces between network RCT and common control unit UCC. Operation of network access devices DAR is considered as rapid when their connections with common control unit UCC is synchronous. They can exchange informations between terminal circuits with which they are associated to and common control unit UCC — and vice versa — within a time duration imposed by UCC. Operation of network access devices DAR is considered as slow when they operate in an asynchronous manner, that is, at the rate of terminal circuits that they supervise, in accordance with an order received from common control unit UCC and to which they further transmit the result when the order has been performed in the terminal circuit.

In network access devices DAR, there is a first set of slow scanners EXL which are utilized to interrogate test points of subscriber line circuits LA for four possible conditions: free subscriber, calling subscriber, called subscriber, and false call or faulty line.

A second set of slow scanners DL have access to junctors JA, JD, outgoing senders EVD and incoming receivers RA. They control relatively slow electromechanical operation elements such as relays and terminal circuits for (1) condition control, (2) selection signal, and (3) information transmission.

Acting as rapid scanners are distributors EDR which have access to the same categories of terminal circuits as slow scanners. They can test points in terminal circuits other than subscriber line circuits LA and have the same function concerning those circuits as slow scanners. The selection between slow and rapid scanners is made by considering the time accuracy required for detecting or transmitting signals.

Markers MR have access to any terminal circuits having a tunable RF receiver R. On instructions from the common central unit UCC, a marker will couple itself either to a subscriber line circuit LA or a junctor JA or JD, in order to write information into a register associated with the frequency synthesizer of such a circuit, the information written may correspond either to the called or the calling subscriber so that the synthesizer of the receiver R in the selected circuit may tune its frequency to the transmitter frequency of the circuit to which it is connected. The connection may be established between the two circuits through a RF channel and may be made through the transmission system ST and the transmitters and receivers of the involved terminal circuits.

Figure 2:
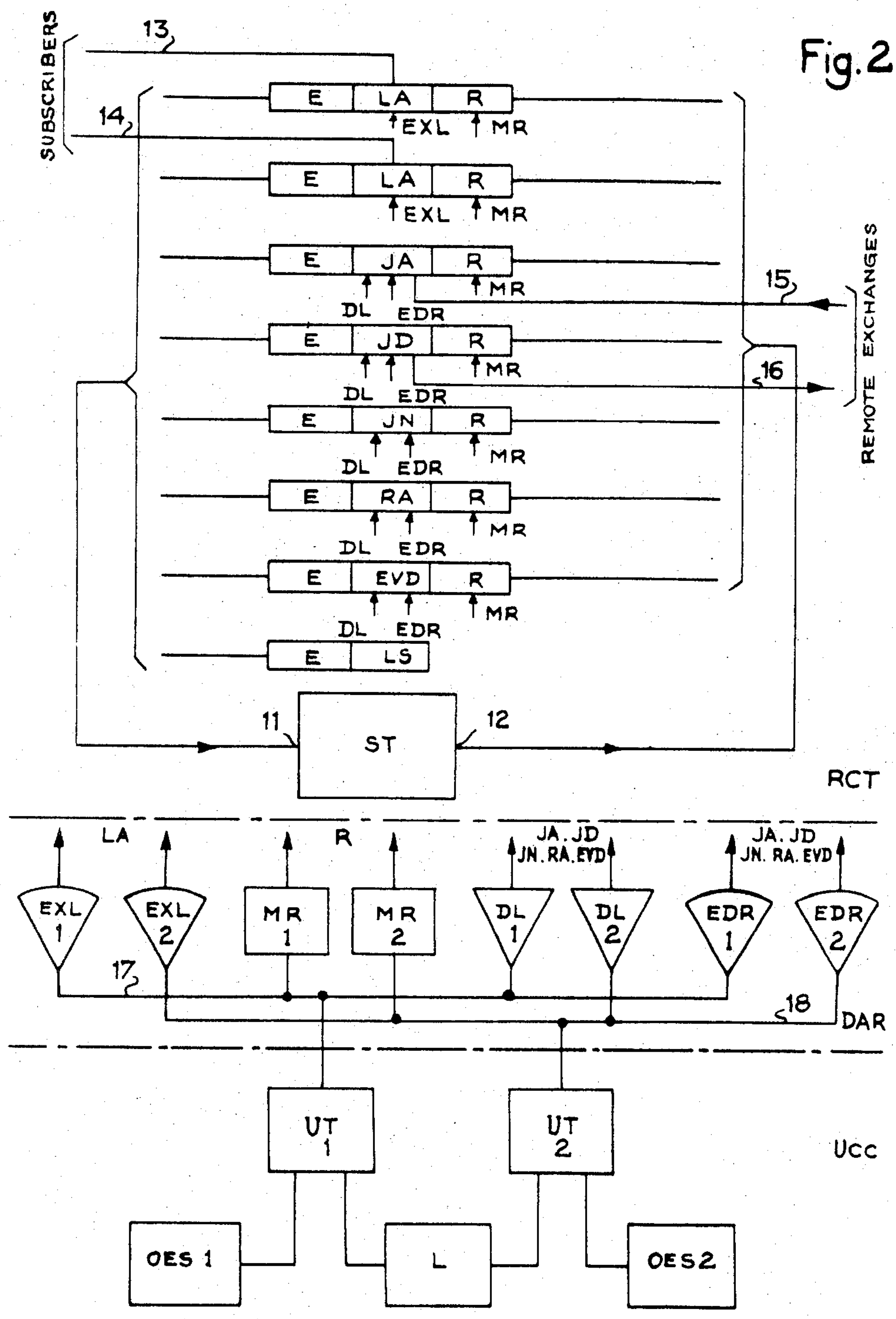
FIG. 2 is a block diagram of an arrangement of various equipment constituting a telecommunication exchange using a frequency multiplex switching system.

In order to simplify the showing of FIG. 2, only arrows have been used to indicate the circuits served by the various network access devices. Thus slow scanners EXL are shown with arrows directed to the associated terminal circuits, LA, such as subscriber line circuits. Conversely, terminal circuits LA are shown with arrows marked EXL which indicate the identity of the network access device which may be connected thereto. Network access devices are duplicated for reliability reasons. They are respectively connected either to one common control unit UCC or the other one by access bus as 17 and 18, in known fashion.

The common control units are identical and are duplicated for reliability reasons, as is well-known. Each command control unit comprises a processing unit UT which provides all the storage functions and logic functions for the system. Each processing unit UT comprises a central memory for registering programs, semipermanent data such as translation tables and variable data useful for directing a path search. The exchange, the processing unit UT also comprises (1) a central unit for performing operations defined by program instructions, (2) input/output channels for transmitting data to and from network access devices, and (3) large capacity subsidiary memories for storing data, such as metering or observed traffic.

The two processing units UT1 and UT2 of the exchange may communicate through a two-way interface device L. Each processing unit may communicate with input-output supervision maintenance devices OES1 or OES2 which constitute man-machine communication means for common control unit UCC.

The description of FIG. 2 shows one arrangement of the common equipment of a stored program common control exchange. However, computer control is not necessary for the operation of a frequency-division switching network and the following description of FIG. 3 relates to the means utilized for implementing that type of switching during the successive steps of establishment of a telephone communication.

Figure 3:
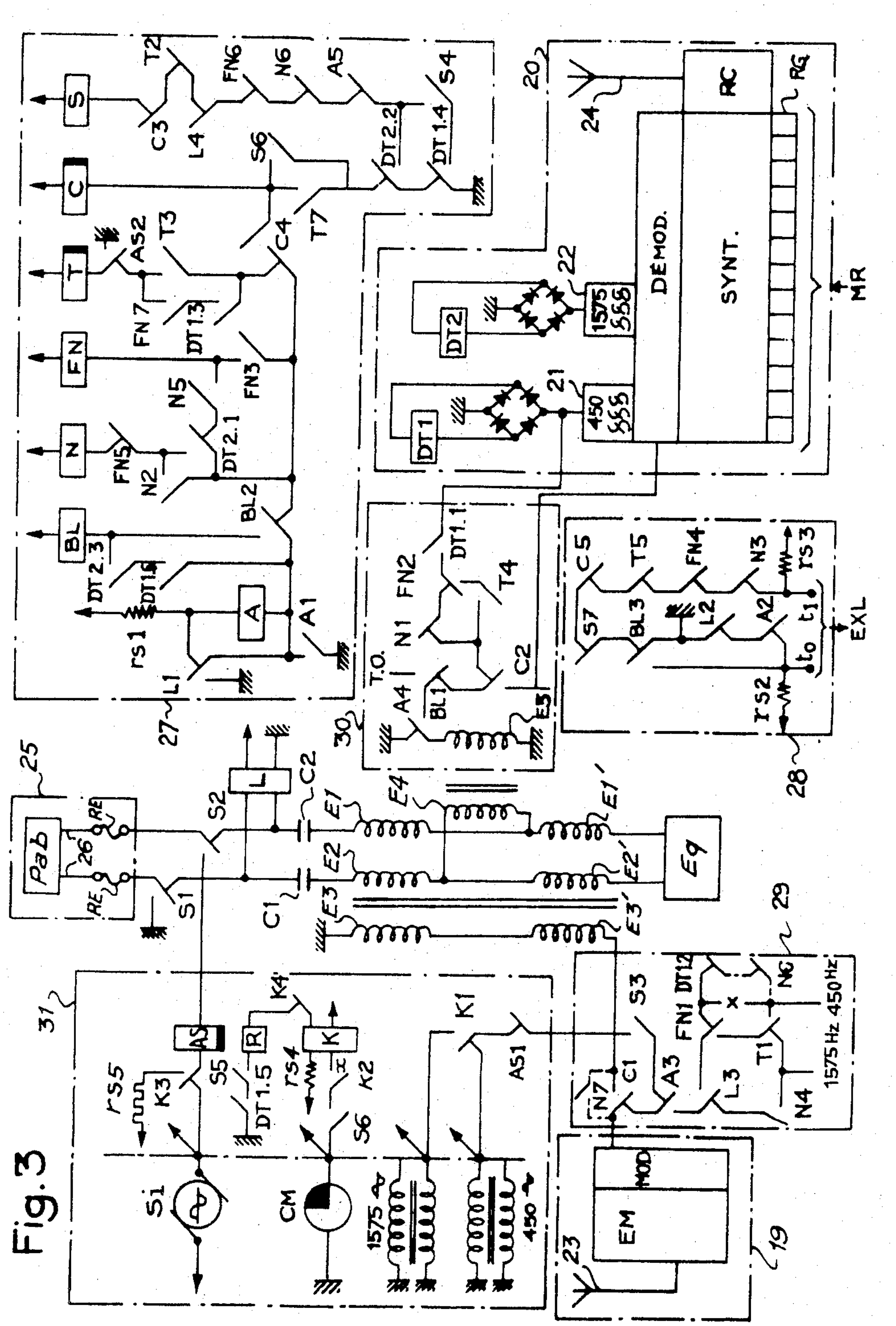
FIG. 3 shows the diagram of a subscriber line circuit, using our invention in a system as shown in FIG. 2.

The components shown in FIG. 3 are grouped within assemblies enclosed within dash-dot lines. The distribution of assemblies in the groupings have been made by function. Relative to FIG. 2 it was noted that subscriber line circuit LA was associated with a transmitter E and a receiver R. This association is also shown in FIG. 3, a transmission group line circuit being indicated by the box referred to as 19 while a reception group line circuit is indicated by box 20.

The mode of transmission and reception need not be described presently. The RF transmitter EM of line circuit 19 is supplied from a modulation system MOD translating voice frequency signals into a fixed frequency band associated with the subscriber connected to a particular line circuit. Voice frequency is supplied from RF receiver RC of the line circuit of group 20 and demodulated in demodulator DEMOD. Synthesizer SYNT allows receiver RC to be tuned to a frequency band defined by the number of the called subscriber, the called subscriber being either another subscriber in the same exchange in the case of a local call, an incoming or outgoing junctor in the case of a toll call, or a service line in the case of particular signalings which have to be transmitted to the calling subscriber. The called subscriber number is provided in a binary form by marker MR- which has received that number from common control unit UCC (FIG. 2) and the number is stored in register RG. Receiver outputs are connected to two filters 21 and 22 which are respectively tuned to voice frequency 450 Hz and 1575 Hz utilized for signaling. Each filter 21 and 22 is associated with a rectifier bridge, one terminal of which is connected to a detector relay DT1 for 450 Hz frequency, and DT2 for 1575 Hz frequency.

Transmitter EM and receiver RC are each connected to a respective antenna 23 or 24 which is associated with the transmission system ST shown in FIG. 2 and those antennas are arranged in the frequency-division switching room 6, FIG. 1. The other function groups shown in FIG. 3 include subscriber set Pab within group 25 connected to the telephone exchange. The connection comprises the two-wire line 26 and the usual protection equipment (not shown) arranged in the input distribution frame RE of the exchange.

As is known, a subscriber line may pass through successive switching conditions during the establishment of the communication depending on whether the subscriber is the calling party or the called party. Thus, when a subscriber wishes to establish a communication, its line goes into the off-hook condition following which the subscriber receives dial tone before initiating dialing, called herein entering the dialing condition. At the end of the dialing condition, the subscriber receives either a tone indicating to him that ringing signal is being sent to the called party or a busy tone. On hearing busy tone, he restores his phone to the on-hook condition and his line returns to the rest condition. If he does not restore his phone, his line is set in a blocking condition.

Similarly, an idle called party line goes from the rest condition to a ringing signal receiving condition. Both subscriber lines go into the conversation condition as soon as the called subscriber has answered by going off-hook. At the end of the communication, each line restores to its on-hook condition or is set in blocking condition if the subscriber does not restore his phone. Those various conditions and the transitions from one to another are controlled by a logic assembly 27 constituted by electromagnetic relays A, BL, N, FN, T, C, S and a relay L providing supervision and DC supply to telephone set Pab.

The contacts of these relays, which are grouped in box 28 inform slow scanner EXL of four characteristic line conditions: idle, calling, busy, blocked.

Other assemblies of relay contacts are grouped in boxes 29 and 30. Assembly 29 enables modulator MOD to send signaling frequency and voice currents as necessary toward the calling party. Assembly 30 controls transmission of tones and voice currents received from another subscriber to subscriber set *Pab* after demodulation in demodulator DEMOD.

The connections between telephone set Pab and transmission assembly 19 and reception assembly 20 are made through a hybrid transformer comprising winding E1–E', E2–E2', E3–E3', E4 and E5. A balancer E*q* is associated with the transformer windings and serially connected with subscriber line wires. Balancer Eq must have an impedance close to that of the line for any frequency transmitted on that line. It will be noted that capacitors C1 and C2 which separate the line from hybrid transformer winding provide transformer decoupling with respect to DC and to supply current to set *Pab*.

Assembly 31 includes a generator or source of tones and ringing current, and is provided with a beating relay K, a delay circuit R and a ringing stop or ring trip relay AS.

The operation of the subscriber line circuit shown in FIG. 3 will now be described, using certain conventional designations. For example, symbol RK1 designates the first contact of relay K, a break or back contact. Symbol TK2 designates the second contact of relay K, a make contact. In addition, the various components of the circuit shown in FIG. 3 — particularly electromagnetic relays — are shown with the contacts of the relays in the position corresponding to the relays in their inoperative state. Finally, all the circuits leading to a common DC supply source or battery are terminated by an arrow. A ground indication is also shown.

When the subscriber of the telephone set *Pab* goes offhook, a line loop is closed at the set between line loop conductors 26. The closed loop completes a circuit for supplying the set *Pab* from a voltage source at the terminals of relay L in the telephone exchange, the supply path including back contacts RS1 and RS2, and the input distribution frame RE. The current flow energizes relay L which signals the off-hook condition for the set associated with the line circuit.

Make-contact TL1 is switched by the operation of relay L, causing relay A to be energized over a path from ground at contacts L1 through relay A to resistor rs1 and battery. Relay A is then held by its own contacts TA1.

The state of line condition is indicated by assembly 28 to slow scanner EXL. Such a condition is indicated in a binary form by polarities — positive polarity or ground, and negative polarity or battery — which are applied to interrogation points *t*0 and *t*1. Before set Pab entered the off-hook condition, all the contacts of assembly 28 were at rest, ground was applied to both points *t*O and *t*1 indicating the at-rest or on-hook condition of the subscriber line circuit to slow scanner EXL. As soon as set *Pab* goes into the off-hook condition and relays L and A are operated, contacts RL2 and RA2 have opened and only point *t*1 is still connected to ground while point *t*0 is connected to battery through resistor *rs*2.

Slow scanner EXL sequentially scans the subscriber line circuit test points. When in the course of the scanning it reaches a circuit in which the binary combination of points *t*0 and *t*1 has just been altered since the last look, scanner EXL records the change and transmits the circuit number to common control unit UCC. The control unit UCC (FIG. 2) searches for the characteristics of the calling subscriber (for instance, normal service subscriber, limited service subscriber) and from data stored in memory, and selects an idle dialing junctor JN, FIG. 2. The control UCC provides the identity of the switching equipment to be connected to a marker MR, FIG. 2. Register RG in receiver 20 receives the number of the junctor JN selected and the register RG in the receiver of junctor JN receives the number of the subscriber line circuit involved.

At the same time as the energized condition of relays L and A indicates to scanner EXL the condition of a calling subscriber seeking service and a signal of 450 Hz is sent to modulator MOD over a path in assembly 29 through closed contacts RC1, TA3, TL3, R FN1 and the optional strapping indicated as a cross. The 450 Hz signal is modulated in assembly 19 to the frequency corresponding to the subscriber line circuit and, as soon as dialing junctor JN is tuned to that frequency, the junctor receiver receives the signal modulated by 450 Hz which has been transmitted from antenna 23. In the reverse direction, junctor JN transmits, through its transmitter, dialing tone back to the calling subscriber.

Register RG of assembly 20 having received the identity of junctor JN through its synthesizer SYNT tunes receiver RC to that frequency. Thus, when transmitter of junctor JN transmits dial tone (450 Hz) modulating its proper transmission frequency, receiver RC in assembly 20 is responsive to that signal which reaches filter 21 after having been demodulated in demodulator DEMOD. As a result, a voltage differential appears across the diagonal of the rectifier bridge connected to filter 21. Relay DT1 connected to the terminals of that diagonal arm is thus energized.

Contact T DT1.1 in assembly 29 is closed so that dialing tone at 450 Hz is applied to hybrid transformer winding E5 in assembly 30 via T DT1.1, R FN2, R N1, R C2, R BL1 and T A4. The 450 Hz signal is induced in winding E4 and reaches calling subscriber set *Pab* via contacts R S1 and R S2.

The calling subscriber hears the dialing tone. Assuming that the calling subscriber set is provided with a rotary dial, after having dialed each digit, he releases the dial finger wheel. The subscriber loop between the conductors of line 26 is pulsed dependent on the number of the digit resulting in a like number of releases of relay L. It will be noted that relay A is short-circuited by contact RL1 during each release period of relay L. However, those release periods are too short and relay A is not short-circuited for a sufficient time to release itself.

At the first release of relay L, contact T L3 in assembly 29 opens and cuts transmission of the 450 Hz signal to modulator MOD. Thus transmission assembly 19 no longer transmits the 450 Hz modulated signal to junctor JN. As the receiver in junctor JN no longer receives the signal, it also ceases transmitting the 450 Hz modulated signal and replaces it by a 1,575 Hz modulated signal. This signal is received in reception assembly 20, is demodulated, and reaches filter 22. A voltage differential appears across the diagonal arm of the rectifier bridge, causing relay DT2, mounted between the terminals of this diagonal arm, to become operative. It will be noted that when reception of the 450 Hz signal has ceased, relay DT1 has released. When contact T DT1.1 opens, dial tone transmission circuit ends.

Relay DT2 by operating causes relay N in assembly 27 to turn on via T DT2.1, R BL2, T A1 to ground. Relay N is held by its own locking contact T N2 and by its operation, indicates the dialing condition to scanner EXL by a change of polarities displayed at points *t*0 and *t*1. When contact R N3 opens following operation of relay N, point *t1* is no longer grounded. Point *t1* instead receives only battery through resistor *rs*3 thus indicating a busy condition to the scanner. The scanner informs control UCC accordingly.

Dial pulses corresponding to releases of relay L are then transmitted in the form of 1,575 Hz signals between pulses at 450 Hz. Further, during releases of relay L, contacts R L3 in assembly 29 close and connect modulator MOD to the source of 1,575 Hz signals via T N4. During each operation of relay L, modulator MOD is connected to the 450 Hz source via T L3 and R FN1.

Therefore, in the manner shown by FIG. 2, dialing junctor JN receives modulated dialing signals and transmits these to control UCC. When control UCC ascertains that dialing has been really completed, it indicates to junctor JN through rapid scanner-distributor EDR. At that time, junctor JN cuts the transmission of the signal modulated at 1,575 Hz.

In the subscriber line circuit, as receiver RC no longer receives any signal from junctor JN, filter 22 becomes inoperative and relay DT2 releases. Once contact R DT2.1 in assembly 27 has restored, an energizing path to relay FN is completed over closed contacts T NS. Relay FN operates and is held by its contact T FN3 over a path through R BL2, TA1. The operation of relay FN provides an indication of the completion of dialing at the subscriber line circuit. Opening of contact R FN4 in assembly 28 confirms the busy condition already indicated by opening of RN3 to the slow scanner EXL.

When subscriber set Pab is equipped with a pushbutton dial producing voice frequency tones, the line circuit is modified in the following manner: In assembly 29, the crossed strapping is no longer provided, and is replaced by contacts R DT1 and R N6 while contact TN7 is connected in parallel with contact TC1.

As described previously for a rotary dial equipped set, the process is the same up to the time that dial tone is sent to set *Pab*. In other words, relay L has been energized when the subscriber has gone off-hook. In turn, relay A has been operated, points *t*0 and *t*1 of assembly 28 have indicated to slow scanner EXL that the line circuit is in calling condition; the transmitter 19 has transmitted a signal modulated at 450 Hz to a dialing junctor which, in turn, has also transmitted another signal at 450 Hz to the subscriber line circuit of FIG. 3. After demodulation in assembly 20, relay DT1 has been energized and dialing tone at 450 Hz has been sent to the subscriber of set *Pab* via contact T DTD.1 and induction between hybrid transformer windings E5 and E4.

In the case of a pushbutton keyboard set within assembly 29, the 450 Hz signal directly reaches contact FN1 - the crossed strapping being not present. The signal passes through contacts R DT1.2 and RN6 so that when relay DT1 is energized, contacts R DT1.2 open. Opening of contacts DT1.2 cuts transmission of the 450 Hz signal to modulator MOD, and to the dialing junctor JN associated with the RF channel, so as not to disturb the transmission of audio-frequency tones which are transmitted each time a pushbutton is depressed in set *Pab.* As described for a rotary dial set, when transmission of the 450 Hz signal to junctor JN has terminated, transmission of the same signal from the junctor to reception assembly 20 ceases and is replaced by a signal modulated at 1,575 Hz. After demodulation, relay DT2 is energized while relay DT1 is at rest, the 450 Hz signal from junctor JN having ceased to be received. Dial tone to calling set Pab is shut off after contacts T DT1.1 open; relay N is energized by T DT2.1 and precludes signal at 450 Hz from being transmitted to modulator MOD by opening contact R N6 in assembly 29.

Each time a keyboard pushbutton is pushed down, a combination of audio-frequency tones passes through hybrid transformer and is induced in windings E3–E3′. That frequency combination is applied to modulator MOD by contact T N7 and, after modulation is transmitted to dial junctor which transmits it to UCC. When UCC recognizes that the dialing is complete, as already described, junctor JN ceases to transmit the modulated 1,575 Hz signal which causes relay DT2 to release and relay FN to operate, via assembly 30 contacts R DT1.1 and T N5.

The dialing completion condition once again recurs as previously described relative to rotary dial equipped set operation.

When contact R FN5 of assembly 27 opens, relay N is released in the sequence of assembly 27 to indicate the end of dialing.

Contacts T FN1 in assembly 29 connect modulator MOD and transmitter EM of assembly 19 to the source of 1,575 Hz signal via contact R T1. The modulated signal transmitted from the subscriber line circuit is received by dialing junctor JN which releases and causes the calling subscriber line circuit number to be erased in the register of its synthesizer.

Common control unit UCC, in the example of a local call, searches to determine whether the called subscriber line is idle.

The common control unit UCC utilizes a marker MR, FIG. 2, to write the selected called subscriber line circuit number into the called subscriber line circuit synthesizer register, the last-mentioned circuit being identical to that shown in FIG. 3. Control UCC assigns a marker MR whose number replaces the number of the dialing junctor JN, which is still stored in the register RG of synthesizer SYNT.

When the new information is stored in the line circuits La of the calling and called subscribers (FIG. 2), a 1575 Hz signal is received by receiver RC of assembly 20 in the called subscriber line circuit to be demodulated by its demodulator DEMOD and cause relay DT2 to be energized through filter 22. It will be noted that the called subscriber line circuit is identical to that shown in FIG. 3, but contrary to calling subscriber line circuit all relays are at rest in called subscriber line circuit. Thus, relay DT2, in operating, energizes relay S if sequencer 27 over a path from ground via contacts T DT2.2, R A5, R N6, F FN6, R L4, R T2 to contacts R C3.

Operation of relay S in the sequencer 27 of called subscriber line circuit indicates the ringing phase or condition. Contact T S3 of assembly 29 closes and connects transmission assembly 19 to source of 450 Hz signals included in tone and ringing generator 31, the connection path being traceable over contacts R C1, R A3, T S3, R AS1, R K1. The transmitter of assembly 19 in the called subscriber line circuit thus transmits a 450 Hz signal modulating its carrier to the calling subscriber line circuit. In the calling subscriber line circuit, the 450 Hz signal after having passed through demodulator DEMOD and the filter 21 from the called subscriber line circuit causes relay DT1 to operate so as to change the condition of sequencer 27. Relay T is energized over a path through contacts T A1, R BL2, R C4, T DT1.3, T FN7 and R AS2, and is held by its contact T T3. Relay T indicates the busy test condition of either ringing or busy signals. The 450 Hz signal is applied to hybrid transformer winding E5 in assembly 30 via contacts T DT1.1, T FN2, T T4, R C2, R BL1, and T A4. The 450 Hz signal is induced into winding E4 and heard by the subscriber of the calling set Pab. However, in closing contact T T1, relay T controls the connection of the calling subscriber transmission assembly to the source of 450 Hz signals. Assembly 19 ceases to transmit the modulated 1,575 Hz signal and replaces it by modulated 450 Hz signal. It is to be noted that opening of contacts R T5 in assembly 28 confirms the busy condition of the circuit to the slow scanner EXL.

In the called subscriber line circuit, as soon as relay S is energized, the busy condition of the circuit has been indicated by opening of contact S7 in assembly 28, which changes the polarity of test points *t*0 and *t*1. The slow scanner EXL detects ground from point *t*0 and resistance battery from point *t*1. In the same way, when relay S is energized, ringing current is applied to called subscriber set *Pab* via TS1 and TS2. When 1,575 Hz signal ceases to be received, relay DT2 is released. At the same time, relay DT1 is once again energized since the 450 Hz signal replaces the 1,575 Hz signal. Thus relay S is held operated by T DT1.4 and T S4. At that time, a circuit feeding relay K of assembly 31 is established via contacts T DT1.5, T S5 and R K4, resistor rs4 and a circuit R, the circuit C delaying the signal by one second.

In those conditions, relay K is energized after the delay of one second and originally closes only its fast operating or "*x*" contacts K2. It is completely energized when its lower winding is fed during the active phase of cam CM via T S6 and T*x* K2. Ringing current is applied from source S*i* — for instance, at 50 Hz — through relay AS, TS2, line conductors, line loop of set Pab and contact TS1; ringing current is removed as soon as contact R K3 opens. It is replaced by applying DC polarity to subscriber line wires 26, one polarity being ground via TS1 and the other being the battery via TS2 and T K3 through relay AS and ballast resistor rs5. This means that the ringing operation of set Pab is interrupted during the entire time period when cam CM is active to hold relay K operative.

During the interrupt phase of cam CM, relay K is released and ringing current is applied again to set Pab via R K3. On the next rotation of cam CM — relay K being partially energized and contact K2 being only closed — relay K is fully energized and again cuts ringing current transmission to the called subscriber set by opening contact R K3 as previously described. Thus the pulsed or interrupted ringing current is sent to the called subscriber.

At the same time, the calling subscriber has to receive a ring-back tone (450 Hz) which must also be pulsed. To provide this tone to the called subscriber line circuit, relay K is energized after closure of contact T K1. Transmission of the 450 Hz signal to the modulator is ceased and replaced by transmission of the 1,575 Hz signal.

The modulated 1,575 Hz signal transmitted from assembly 19 is received in the calling subscriber line circuit receiver and after having been demodulated it causes relay DT2 to operate. Relay DT1 restores since the 450 Hz signal is no longer received. Opening of contact T DT1.1 opens the circuit through which the 450 Hz tone is sent to calling subscriber set. However, in the called subscriber line circuit, as previously mentioned, relay K is released after the opening of contacts associated with cam CM. In the called subscriber line circuit when contact R K1 closes, transmission assembly 19 is separated from the source of signal at 1,575 Hz, and this signal is replaced by a 450 Hz signal.

The signal modulated at 450 Hz is received in the calling subscriber line circuit reception assembly 20 where it causes relay DT1 to operate, after the signal has been demodulated. As the signal modulated at 1,575 Hz is no longer received, relay DT2 releases. On operation of relay DT1, contact T DTD1.1 closes to transmit tone at 450 Hz to set Pab again.

Accordingly, the calling subscriber receives ringback tone pulse signals since pulses at 450 Hz are transmitted to him separated by a silent period during which the 450 Hz signal is replaced by a 1,575 Hz signal, the 1,575 Hz signal being prevented from reaching the calling subscriber.

When the called subscriber answers and goes off-hook, relay AS in the corresponding line circuit assembly 31 operates. Relay AS is not responsive to AC current so that it cannot operate either on the DC component of ringing current in the event the called subscriber closes the loop during ringing current transmission pulse or by DC current during the silent period when contact T K3 is closed.

On operation, relay AS cuts the connection between transmission assembly 19 and sources of 450 Hz and 1,575 Hz signals by generator 31 by opening its contact R AS1.

Relay T of sequencer 27 is energized by the closing of contacts AS2. Relay S of sequencer 27 releases on the opening of contacts R T2. Opening of contacts T S1 and T S2 suppresses transmission of ringing current to the called subscriber and causes relay AS to release.

The closed subscriber loop in set Pab causes relay L to operate and in the called subscriber line circuit sequencer 27, relay A operates via operated contacts T L1. Relay T is held over a path through contacts T A1, R BL2, R C4, T T3 and R AS2. Opening of contacts R L2, R A2, R T5 of released relays L, A and operated relay T provide a confirming indication of the busy condition that has previously been indicated by opening of R S7 to slow scanner EXL.

Opening of contacts R AS1 causes transmission assembly 19 to be disconnected from signaling sources (450 Hz and 1,575 Hz) in the called subscriber line circuit, so that the two relays DT1 and DT2 are also at rest in calling subscriber line circuit reception assembly 20. Accordingly, relay S of the calling subscriber line circuit sequencer 27 is no longer energized due to opening of contacts DT1.4 and T DT2.2. When normally closed contacts DT1.4 and R DT2.2 have closed, relay C operates via contacts T T7 and is held via TC4 and T A1. In assembly 28, opening of contact R C5 provides a confirming indication of the calling subscriber line circuit busy condition to the slow scanner EXL.

The operation of relay C provides an indication of the speech phase of the call. When contacts R C4 have opened, relay T releases slowly due to its slow-to-release sleeve. When contacts RC2 open in assembly 30, the calling subscriber in the reception circuit is cut out and hybrid transformer winding E5 is directly connected to output of demodulator DEMOD via contacts T C2, T A4, and R BL1. Thus the reception circuit for demodulated speech signal from the called subscriber to calling subscriber is established. In assembly 29, the transmission circuit of voice signals to the called subscriber is also closed via contacts TC1, those voice signals being induced between hybrid windings E1, E1′, E2, E2′, E3, and E3′, and modulated in assembly 19.

It is to be noted that when contacts R C1 open, they cut the connection from calling subscriber line circuit modulator MOD to the source of 450 Hz. Accordingly, the called subscriber line circuit receiver no longer receives modulated signals which results in relay DT1 releasing. In the called circuit, relay C operates via contacts T T7, R DT2.2 and R DT1.4. Relay C provides the indication of the speech phase in the called subscriber line circuit and consequently causes slow release of relay T by opening contacts RC4. Furthermore, relay C is held by contacts T C4 to provide a confirmation of the busy condition to slow scanner EXL by opening contact R C5. The reception circuit for each signal from the calling subscriber is completed when contacts T C2 close to connect the reception assembly 20 to winding E5 and to demodulator DEMOD. The transmission circuit for speech signals to the called subscriber is established when contacts TC1 close, connecting transmission assembly 19 to hybrid transformer winding E3, E3′ and modulator MOD.

When either one or the other subscriber releases his set (goes on-hook) the subscriber loop between the conductors of line 26 in set Pab is opened. As a result, relay L releases in the corresponding subscriber line circuit. Although short-circuited by contact R L1 for a long time, relay A in turn releases. When contacts T A1 open, relay C is no longer energized and is released after a delay. The delay is used to signal the condition change of the corresponding subscriber line circuit to slow scanner EXL. During the release delay period for relay C, the indicating condition at point ***t*0 is grounded via contacts R A2 and R L2, and point *t*1** is still connected to battery through resistor rs3 (with contacts R C5 open). This temporary combination of polarity conditions corresponds to a line circuit blocking condition.

Notice of the temporary condition is sent to common control unit UCC, FIG. 2, via slow scanner EXL. Control UCC deduces therefrom that the involved line circuit register RG has to be reset through marker MR. Accordingly, when the release delay period of relay C has elapsed, the involved line circuit is completely released and the release condition is indicated to slow scanner EXL by applying ground to both points ***t*0 of assembly 28 via contacts R A2 and R L2 and to point *t*1** via contacts R BL3, R S7, R C5, R T5, R FN4, R N3.

But control UCC also deduces therefrom that a busy signal must be sent to the party which has not still released. To provide the busy signal, the corresponding subscriber line circuit must be connected to one of the service line circuits LS shown in FIG. 2, continuously transmitting the blocking tone message, i.e., a mix of signals at 450 Hz and 1,575 Hz. For that purpose, control UCC writes into register RG, the identity of the service line circuit LS connected to the as yet unreleased subscriber line circuit assembly 20, such a writing being made through marker MR. Synthesizer SYNT is notified the frequency proper to circuit LS on which it must be tuned. The service line circuits LS may be continuously operating simple transmitters, each having its own address number corresponding to the frequency band within they continuously transmit their message, such a message being different for each category of circuits LS.

The receiver RC of the tuned subscriber line circuit reception assembly 20 receives signals modulated at 450 Hz and 1,575 Hz from service line circuit LS. After demodulation in demodulator DEMOD, filters 21 and 22 operate and cause both relays DT1 and DT2 to operate.

In the unreleased subscriber line circuit, relays L, A and C are still operated. As soon as relays DT1 and DT2 operate, relay BL is energized via T A1, T DT1.6 and T DT2.3. Relay BL is held by contacts T BL2 and opens contacts R BL2, removing ground from relay C which releases slowly due to its slow-to-release sleeve. The circuit condition indicated to slow scanner EXL from the polarity applied to points t0 and *t*1 of assembly 28 is changed. Point *t*1 is still connected to battery through resistor *rs*3, but point t0 is now grounded via contact T BL3. This polarity combination corresponds to the subscriber line circuit blocking condition. Busy tone, indicated by letters T.O. in assembly 30 is then sent to the subscriber of set Pab via T BL1, T A4 and induced into the hybrid transformer windings E5 and E4. When the concerned subscriber goes on-hook, the opening of the loop comprised of conductors 26 causes relay L to release followed by the release of relay A after a certain delay because its winding is short-circuited by contact R L1. When relay A has released, relay L is no longer supplied via T A1 and slowly releases. Relay C also releases at the end of its release delay.

Then the subscriber line circuit is idle and that condition is indicated to slow scanner EXL by applying ground to both points *t*0 and *t*1 of assembly 28, all the contacts being released.

It should be noted that, as described in relation with the subscriber line circuit which has first released, the temporary blocking condition of the circuit during the operate time of relay BL lasts for an interval which is utilized in common unit UCC to cause reset of register RG in synthesizer SYNT assembly 20 by means of marker MR.

In the above description, it was assumed that the called subscriber set was idle and that ringing current could be sent to him. In the event the called subscriber is busy, common control unit UCC, FIG. 2, is notified of called subscriber busy condition and concludes that the busy condition must be signaled to the calling subscriber. Control UCC utilizes a marker MR to write the identity of the service line circuit LS continuously transmitting the message concerning the busy tone, i.e., a mix of signals at 450 Hz and 1,575 Hz into register RG of calling subscriber assembly 20. When synthesizer SYNT in that circuit has indicated the condition by means of the transmission frequency of that category of service line circuits LS, receiver RC receives the modulated mix of signals at 450 Hz and 1,575 Hz transmitted from circuit LS. After demodulation in demodulator DEMOD and filtering through filters 21 and 22, those two signals cause corresponding relays DT1 and DT2 to operate.

As the calling subscriber has reached a condition indicating dialing completion, relay FN of sequencer 27 is operated. As soon as both relay DT1 and DT2 have operated, relay BL operates via contacts T DT1.6 and T DT2.3 and is held via T BL2 and T A1. As contacts R BL2 open, relay BL cuts the ground supply circuit for relay T. Relay BL also causes relays FN to release and as contact T BL3 closes, indicating to slow scanner EXL in assembly 28, the line circuit blocking condition, i.e., ground at point t0 and resistance battery at point *t*1. Busy tone is sent to the calling subscriber via contacts T BL1, T A4 and hybrid transformer windings E5 and E4.

When the calling subscriber releases his set, the resulting loop opening in set Pab causes relay L to release and short-circuits relay A for release as previously mentioned. As contact TA1 opens, relay BL releases. All the line circuit relays being at rest, the circuit is idle and this condition is indicated to the slow scanner by ground at both points *t*0 and *t*1 of assembly 28.

If the calling subscriber delays his release excessively, relays L and A remain operated. Consequently, relay BL is still operated and the blocking condition will be maintained because contacts T BL3 are closed and R BL3 open. After a suitable timing interval, command control unit UCC defines the steps to be taken in order to indicate that abnormal condition to the calling subscriber.

A similar situation occurs when the subscriber goes off-hook, and delays dialing or does not dial at all. Such a situation characterizes a "false call" condition. It corresponds to relays L and A energized in the subscriber line circuit. After a dialing junctor has been connected controlled by command control unit UCC, the dialing junctor transmits a signal modulated at 450 Hz.

This signal is the same as the dial tone and is received in the calling subscriber line circuit assembly 20 and, as previously mentioned energizes relay TD1. A signal is transmitted to the subscriber through filter 21, windings E5 and E4 and contacts TD1.1, R F2, R N1, R C2, T A4.

As long as the subscriber refrains from dialing, the circuit remains in the condition and slow scanner EXL finds the calling subscriber condition each time it scans test points *t*0 and *t*1 in assembly 28. The condition information is regularly forwarded to command control unit UCC. After a predetermined time, control UCC determines that the circuit is in a calling condition without dialing, i.e., false call condition. The command control unit UCC transmits to the line circuit register RG, via marker MR the address of the service line circuit LS to which it is to be connected. After being tuned by synthesizer SYNT to the frequency band of circuit LS belonging to the category which continuously transmits a combination or signal at 450 Hz and 1,575 Hz, reception assembly 20 receives that modulated signal mix. As previously mentioned for the blocking condition, DT1 and DT2 are energized. Relay BL is also energized over a path by way of contacts T DT1.6, T DT2.3 and T A1. Transmission of busy call signal to the calling subscriber via T BL1, T A4, and hybrid transformer windings E5 and E4 complete the signal path.

When contact T BL3 closes and contact R BL3 opens, the combination polarity at points *t0* and *t1* of assembly 28 is reversed and ground appears at point *t0* and resistance battery at point *t1*, a condition characteristic of a blocked line condition or false call condition.

At the line circuit of the set remaining off-hook after the other party has already restored at the end of the call, relays L and A remain operative as well as relays BL. As the blocking condition continues, slow scanner EXL detects the condition and informs command control unit UCC accordingly. After a suitable timing interval, UCC determines the steps to be taken for signaling the false condition of the circuit and the false call subscriber set.

Certainly other functions may be allotted to the service line circuit, such as line circuits being capable of transmitting speech information framed by a signal at 450 Hz for a duration of one second. Such voice frequency information may concern transferred and disabled subscriber lines. Thus at the end of the dialing operated by the calling subscriber, command control unit UCC is aware whether such a voice frequency information must be transmitted to that subscriber in accordance with the dialed number.

In such a case, UCC addresses the number of suitable category service line LS to calling subscriber line circuit register RG by way of the marker. Synthesizer SYNT tunes the receiver to the frequency band of that category of lines LS so that assembly 20 receives either a signal modulated at 450 Hz or a voice frequency signal depending on the time of the establishment of the connection between the two circuits.

If the signal is the voice frequency one, demodulator DEMOD after demodulating delivers an output which cannot be transmitted to the subscriber. With contact T C2 in assembly 30 being open, the line circuit is not in the speech condition indicated by relay C in operation in sequencer 27.

At the end of the voice frequency information, circuit LS transmits the signal modulated at 450 Hz which will enable the calling subscriber line circuit to turn to its conversation condition. After having been demodulated and filtered in filter 21, the 450 Hz signal causes relay DT1 to operate. With the circuit in dialing terminated condition, relays L, A, FN are operative.

In that condition, when contact T DT1.3 closes, relay T is energized since contact T FN7 is closed. Relay T is held by T T3. Opening of contacts R T5 confirm the indication of the busy condition indicated assembly 28 to slow scanner EXL.

The 450 Hz signal from the filter is then sent to the subscriber via contacts T DT1.1, T FN2, T T4, R C2, R BL2, T A4 and hybrid transformer windings E5 and E4. After a one second delay, when circuit LS ceases to transmit the signal at 450 Hz, relay DT1 releases. The tone is no longer transmitted to the subscriber and the sequencer is turned to its conversation condition after relay C operates via contacts T T7, R DT2.2, R DT1.4. Relay C is held via contact T C4 with the opening of contact R C4 serving to cut the ground supply circuit for relay T which slowly releases due to its sleeves.

Opening of contacts R C5 confirms the busy condition of the line circuit to slow scanner EXL. When a voice frequency signal is received in assembly 20, after demodulation from output of demodulator DEMOD (contact T C2 being closed) the voice frequency signal is induced via contacts R BL1 and T A4 into windings E5 and E4, then transmitted to the subscriber set *Pab.*

Having received an indication of the busy condition of the called line subscriber, the calling subscriber goes on-hook and his line circuit is released according to the process previously described. In this process, relay L releases, causing relay A to release via contacts T L1. Opening of contacts T A1 causes relays FN and C to release. During the delay release period of relay C due to its slow-to-release sleeve, the blocking condition is indicated by assembly 28 to slow scanner EXL because R C5 is open. Such a condition is normally temporary and is communicated to command control unit UCC. The control UCC erases information stored in register RG of reception assembly 20. After the release delay, when relay C has released, closed contacts R C5 change the polarity at point *t1* in assembly 28, thus indicating to slow scanner EXL that the subscriber line circuit is idle.

The prior description covers the local operation of a circuit associated with a subscriber line and local operations which are performed in particular conditions by introducing the service line circuit.

The following description covers the establishment of connections at the local exchange for forwarding to or receiving a communication between a local subscriber set and a distant office or exchange. Establishing those communications generally includes incoming and outgoing junctors which are indicated by JD and JA in FIG. 2. Those junctors operate as interfaces between the equipment of the two connected exchanges. Thus they have to process signaling information and speech signals so that they include detectors for signaling and RF transmitters and receivers transmitting throughout the voice frequency band. The connection from the subscriber to the exchange output is made through a line circuit LA associated with that subscriber and an outgoing junctor JD, circuit LA and junctor JD being connected via their transmitters and receivers through the frequency-division switching system ST.

Outgoing senders EVD and incoming receivers RA are also shown in FIG. 2. Those devices are respectively associated with a transmitter E and a receiver R because their functions relate to dialing received from a remote exchange through an incoming junctor or in reverse are sent to that exchange through an outgoing junctor. Therefore, connection must be established between those senders-receivers and incoming-outgoing junctors. Those connections are made through transmitters and receivers thereof and through the frequency-division switching system ST.

Thus, it clearly appears that the method of information exchanges between equipment such as senders and outgoing junctors, or incoming receivers and incoming junctors is basically identical to that which has been described for information exchanges between the subscriber line circuit associated to two parties involved in a local call.

Accordingly, no detailed explanation need be made with regard to junctors, senders, receivers as beyond that necessary for persons skilled in the art to use the circuit elements shown in FIG. 3.

However, as a matter of completing the general explanation, the following describes the operating steps which are sequentially performed for establishing a call between a local subscriber and a subscriber connected to a remote exchange. Reference will be made to FIG. 2.

When the local subscriber goes off-hook, his line circuit LA assumes a calling condition with respect to slow scanner EXL. EXL indicates the calling condition to command control unit UCC which selects a dialing junctor JN and provides the receivers of that junctor JN and of line circuit LA with information enabling those devices to connect to each other by frequency tuning. After the end of dialing, command control unit UCC concludes that the call is not a local call, but instead is a toll call to a remote exchange requiring that an outgoing junctor JD associated with trunks to the called exchange is to be connected to circuit LA. The dialing information must be forwarded to the remote exchange to select the called subscriber. In a same manner used for communicating the identity of circuit LA to dialing junctor JN and reciprocally, command control unit UCC utilizes a marker MR to write into the synthesizer register of a receiver the address of an idle outgoing sender EVD. In addition, the receiver R of junctor JD is tuned to the transmission frequency of transmitter E of sender EVD and in this sender, receiver R is tuned to the transmission frequency of transmitter E of outgoing junctor JD.

When junctor JD has seized the remote exchange and the remote exchange has sent back a dialing tone, suitable signalling is exchanged between transmitter E of junctor JD and receiver R of sender EVD. Sender EVD transmits dialing information through its transmitter E in the form of signals modulated at the frequency of junctor JD which is received by receiver R in outgoing junctor JD and processed in JD before they are transmitted on line to the remote exchange. When the remote exchange signals the end of dialing, junctor JD indicates the condition to command control unit UCC via rapid scanner-distributor EDR.

Command control unit UCC deduces that sender EVD may be released and that a connection must be established between outgoing junctor JD and calling subscriber line circuit LA. For that purpose through marker MR, command control unit UCC resets the synthesizer register in receiver R of sender EVD so as to release this equipment. The control UCC causes the writing into the synthesizer register in receiver R of the address of calling subscriber line circuit LA and the identity of the outgoing junctor JD so that subscriber line circuit receiver R is tuned to the frequency transmitted by transmitter E of junctor JD. Reciprocally, synthesizer register in receiver R of outgoing junctor JD receives identity information concerning the calling subscriber line circuit LA so that receiver R in junctor JD is tuned on the frequency transmitted by the line circuit LA.

The connection between the calling subscriber and the remote exchange is established through line circuit LA and outgoing junctor JD. The conversation between the two parties may begin. When the calling subscriber connected to line 13, FIG. 2, is speaking, calling subscriber speech is transmitted to line 16 via line circuit LA, associated transmitter E, input 11 to transmission system ST, output 12, receiver in outgoing junctor JD, and junctor JD itself. In the other direction, when the called subscriber in the remote exchange is speaking, the speech from the called subscriber is transmitted on line 16 up to line 13 via outgoing junctor JD, outgoing transmitter E, input 11 to transmission ST, output 12, calling subscriber line circuit LA and line circuit LA itself.

While processing an incoming call has not been described in any detail, it is obvious that such a call, i.e., a call from a remote exchange to a local subscriber is processed in a similar manner through ingoing junctor JA and ingoing receiver RA designed for receiving dialing from remote exchange.

While the principles of the present invention have hereabove been described in relation with specific embodiment, it must be understood that the said description has only been made by way of example and does not limit the scope of this invention.

What is claimed is:

1. Frequency-division switching system for interconnecting terminal equipment in a telecommunication exchange through RF means using a closed common volume as a transmission medium electromagnetically shielded from the exterior, each terminal equipment comprising a tunable transmission and a tunable reception device with control means for tuning the respective frequencies of their respective transmission and reception devices, detecting means associated with the reception device of each terminal equipment, said detecting means responsive to one or more signaling frequencies received through an RF transmission equipment and means for controlling suitable switching operations in accordance with the received signaling frequencies, and sending means associated with each transmission device to transmit one or more signaling frequencies to the detecting means associated with another terminal equipment so as to control switching operations in the other terminal equipment.

2. A frequency-division switching system according to claim 1, wherein there is a common control unit for directing the operation of said terminal equipment, means for interconnecting a terminal equipment via RF transmission with an equipment individual to either transmitting or receiving predetermined signaling information, each said terminal equipment comprising means for controlling a predetermined switching operation to minimize the load on said control.

3. A frequency-division switching system according to claim 1, wherein there are sequencing means in each terminal equipment operated in sequence responsive to said controlling means for marking the various consequential steps of a call and to cause resulting switching operations.

4. A frequency-division switching system according to claim 3, wherein there are means for the transmission of signaling and speech and reception thereof and supervision means for indicating the condition of the equipment determined by elements directly responding to the condition of said sequencing means.

5. A frequency-division switching system according to claim 4, wherein said terminal equipment comprises a first group of elements controlled by the said sequential circuit to continuously indicate the condition of the terminal equipment, and scanning means for scanning said elements to determine the condition of said terminal equipment whereby to transmit condition information to the said command control unit.

6. A frequency-division switching system according to claim 4, wherein said terminal equipment involved in establishing the speech circuit comprises a third group of elements controlled by the said sequential circuit, said thrid group of elements being connected to the involved terminal equipment reception device demodulator, to the signaling detector thereof and to the speech circuit, said connection permitting the transmission of signaling and speech signals to the said terminal equipment at suitable times corresponding to a predetermined condition of said sequential circuit.

7. A frequency-division switching system for interconnecting terminal equipment in a telecommunication exchange through RF means within an electromagnetically shielded switching chamber and employing the volume of said chamber as the transmission media for the RF waves generated by said RF means, said terminal equipment comprising a tunable transmission and a tunable reception device with control means for tuning the respective frequencies of their respective transmission and reception devices, a control circuit associated with each device for interfacing between said device and a subscriber set, said control circuit including means responsive to one or more signaling frequencies received through an RF transmission equipment and means for controlling suitable switching operations in accordance with the received signaling frequencies, sending means associated with each transmission device to transmit one or more signaling frequencies to the detecting means associated with another terminal equipment so as to control switching operations in the other terminal equipment, means for sensing the condition of said subscriber set, and means for indicating said conditions in binary form, means for scanning said indicating means for said binary indications, and means for transmitting said binary indications for signaling control purposes.

* * * * *